(12) United States Patent
Ansbacher et al.

(10) Patent No.: US 11,267,302 B1
(45) Date of Patent: Mar. 8, 2022

(54) SUSTAINED NEUTRAL OPERATION OF VEHICLES

(71) Applicant: Ford Global Technologies, LLC, Dearborn, MI (US)

(72) Inventors: Todd Ansbacher, Westland, MI (US); Adam Stratton, Livonia, MI (US); Patrick Kevin Holub, Novi, MI (US); John Robert Van Wiemeersch, Novi, MI (US); Ronald Fitzgerald, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 17/085,625

(22) Filed: Oct. 30, 2020

(51) Int. Cl.
| | |
|---|---|
| *G08B 21/00* | (2006.01) |
| *B60D 1/30* | (2006.01) |
| *B60W 40/105* | (2012.01) |
| *B60L 58/12* | (2019.01) |
| *B60Q 5/00* | (2006.01) |
| *B60Q 1/52* | (2006.01) |
| *B60Q 1/46* | (2006.01) |

(52) U.S. Cl.
CPC .............. *B60D 1/305* (2013.01); *B60L 58/12* (2019.02); *B60Q 1/46* (2013.01); *B60Q 1/525* (2013.01); *B60Q 5/006* (2013.01); *B60W 40/105* (2013.01); *B60W 2520/28* (2013.01); *B60W 2555/60* (2020.02); *B60W 2556/45* (2020.02)

(58) Field of Classification Search
CPC ........... B60D 1/305; B60L 58/12; B60Q 1/46; B60Q 1/525; B60Q 5/006; B60W 40/105; B60W 2520/28

USPC ........................................................ 340/431
See application file for complete search history.

(56) References Cited

U.S. PATENT DOCUMENTS

| | | | |
|---|---|---|---|
| 5,028,907 A | 7/1991 | Windeler | |
| 6,516,925 B1* | 2/2003 | Napier | B60T 1/10 188/112 A |
| 8,005,589 B2 | 8/2011 | MacDonald et al. | |
| 9,956,965 B1* | 5/2018 | Hall | B60W 50/14 |
| 10,040,437 B2 | 8/2018 | Albright et al. | |
| 2012/0004805 A1 | 1/2012 | Gray et al. | |
| 2016/0023525 A1 | 1/2016 | Lavoie | |

FOREIGN PATENT DOCUMENTS

DE 102015201981 A1 8/2016

OTHER PUBLICATIONS

2018 Navigator Owner's Manual (Aug. 2017) Location: http://www.fordservicecontent.com/Ford_Content/Catalog/owner_information/2018-Lincoln-Navigator-Owners-Manual-version-1_om_EN-US-EN-CA_09_2017.pdf.

* cited by examiner

*Primary Examiner* — Tai T Nguyen
(74) *Attorney, Agent, or Firm* — Frank Lollo; Eversheds Sutherland (US) LLP

(57) ABSTRACT

A computer-implemented method includes determining a vehicle configuration indicative of a towing mode setting for the vehicle, which can include a neutral transmission gear setting, a battery conservation mode, or another towing mode setting. The method can include determining at least one vehicle operation characteristic that changes with time while the vehicle is in the towing mode setting, and performing, via a vehicle control module and based at least in part on the towing mode setting and the vehicle operation characteristic, one or more vehicle actions that include generating an alert signal indicative that vehicle damage may be imminent.

18 Claims, 4 Drawing Sheets

SUSTAINED NEUTRAL OPERATION OF VEHICLES

TECHNICAL FIELD

The present disclosure relates to vehicle towing systems, and more particularly, to vehicle towing systems that monitor operation aspects of a vehicle while being towed, and provide indication of sustained neutral operation of the vehicle.

BACKGROUND

When towing a vehicle that includes a shift-by-wire transmission control system, initiating Neutral operation and sustaining that operation can prove difficult when the vehicle is towed over long distances, or for prolonged periods of time. In some vehicles with shift-by-wire, power requirements associated with system controls that maintain the Neutral shift position may deplete vehicle batteries. In other aspects, some vehicle operators may not be aware of particular vehicle transmission modes or settings for towing their vehicle within operational limits set for their particular model. Moreover, conventional methods for managing sustained Neutral operation may not alert the operator of the towing vehicle of error states associated with the vehicle being towed while undergoing towing operations. For example, conventional chimes or instrument panel alerts in the towed vehicle may not be noticed by the driver performing the towing operations in the towing vehicle until the towed vehicle is moving at speeds or in locations incompatible with quick remedy of the situation.

An alarm system adapted for towing is disclosed in U.S. Pat. No. 8,005,589 (hereafter "the '589 Publication"), which includes methods that address improper towing operations. The '589 Publication describes using vehicle power signals and wheel movement signals to alert improper towing of a vehicle through a visual and audible alarm, and by sending a warning message to a remote call center. The alerts could be in the form of the vehicle's horn, headlights, emergency flashers, vehicle theft deterrent systems, and other alerts. However, the '589 Publication does not disclose initiating vehicle startup procedures to recharge the vehicle battery if the alerts are ignored. The '589 publication also does not disclose monitoring the vehicle's alert systems to ensure any mitigating actions comply with local ordinances, such as, for example, not sounding alarms in geographic areas during particular times of the day or night. This can be important when the vehicle is towed in areas that may be sensitive to noise and light output, such as residential neighborhoods, near hospitals, etc.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein are configured to determine whether a vehicle is in a towing mode, and evaluating characteristics associated with the vehicle's motion and/or operation that can determine if the vehicle is being towed in a neutral configuration that is within the operational durability or safety limits for the vehicle. Described systems and methods may determine capability and limitations of the vehicle being towed, and provide periodic updates of ongoing operational status during towing. In some embodiments, the system may alert the towing driver to a readiness status of the vehicle being towed, and provide alerts that may prevent or reduce vehicle damage associated with towing operator error. It should be understood that the disclosed systems and methods are exemplary, may include more or less steps than are shown or described herein, and should not be construed as being limiting in any way.

The system may determine a vehicle configuration indicative of a towing mode setting for the vehicle, which can include a neutral transmission gear setting, a battery conservation mode, or another towing mode setting. The method can further include determining at least one vehicle operation characteristic that changes with time while the vehicle is in the towing mode setting, and perform, via a vehicle control module and based at least in part on the towing mode setting and the vehicle operation characteristic, one or more vehicle actions that include generating an alert signal indicative that vehicle damage may be imminent. Embodiments described herein may provide automated management and alerts using vehicle systems that can prevent vehicle damage caused from improper towing and/or malfunction of sustained Neutral transmission mechanisms. These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

Figure 1:
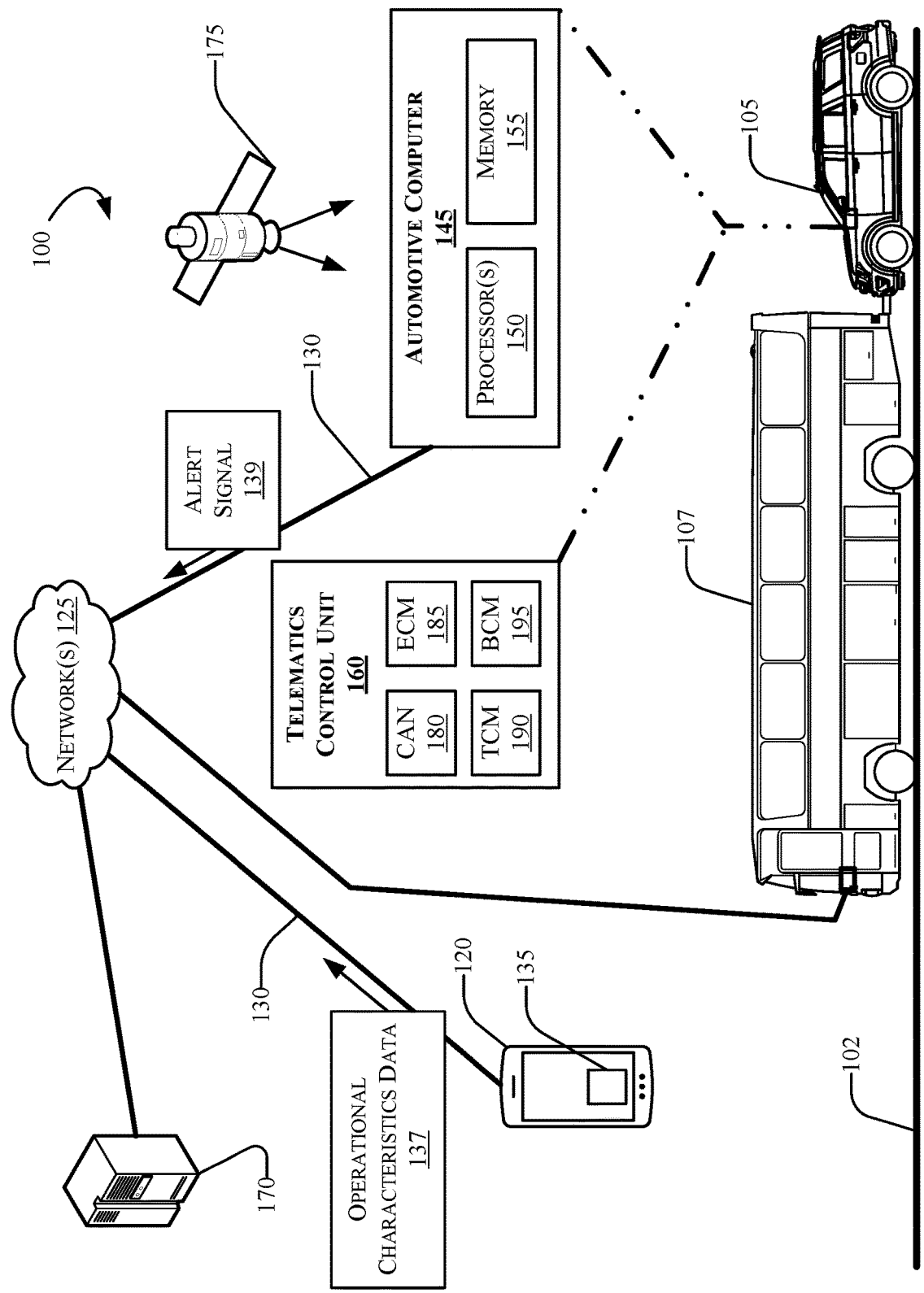
FIG. 1 depicts an example computing environment in which techniques and structures for providing the systems and methods disclosed herein may be implemented.

FIG. 1 depicts an example computing environment 100 that can include one or more vehicle(s) including, for example, a vehicle 105, and a towing vehicle 107, which may be a vehicle configured to tow the vehicle 105. The computing environment 100 depicts the vehicle 105 as having an automotive computer 145, a telematics control unit (TCU) 160, and an established connection to a mobile device 120. The vehicle 105 may be a vehicle that is being towed by the towing vehicle 107, which driver may utilize, for example, a mobile device 120. The mobile device 120 may be communicatively coupled with the vehicle 105 via one or more network(s) 125, which may communicate via one or more wireless channel(s) 130. The mobile device 120 may include one or more application(s) 135.

The vehicle 105 may include an automotive computer 145, which may include one or more processor(s) 150 and memory 155. The vehicle 105 may further include a Telematics Control Unit (TCU) 160, which may be disposed in communication with and/or be a part of the automotive computer 145. The TCU 160 may be disposed in communication with the mobile device 120, and one or more cloud-based server(s) 170, which may be associated with and/or include a Telematics Service Delivery Network (SDN). The vehicle 105 may also receive and/or be in communication with a Global Positioning System (GPS) 175. For example, the GPS 175 may broadcast a GPS signal (not shown in FIG. 1) that the automotive computer 145 may receive and use for geolocation of the vehicle 105, and for determining characteristics described with respect to one or more embodiments.

Although not shown in FIG. 1, the towing vehicle 107 may include an automotive computer and a TCU substantially similar or identical to the automotive computer 145 and the TCU 160, respectively. Accordingly, aspects described herein with respect to the vehicle 105 may apply similarly to the towing vehicle 107, where the towing vehicle 107 may be configured to connect with the automotive computer 145 (either wirelessly via the network(s) 125 and/or via a wired channel not shown in FIG. 1), to make determinations of vehicle operational characteristics associated with the vehicle 105, and use the operational characteristics, in conjunction with the towing mode setting of the vehicle 105, to determine whether the vehicle 105 is likely to experience any damage due to towing operations.

Although illustrated as a sport utility vehicle, the vehicle 105 may be any other type of passenger or commercial automobile such as, for example, a car, a truck, a sport a crossover vehicle, a van, a minivan, a taxi, a bus, etc. Further, the vehicle 105 may be a manually driven vehicle, and/or be configured to operate in a fully autonomous (e.g., driverless) mode or a partially autonomous mode. Further, the vehicle 105 may use a conventional combustion engine, an Electric Powertrain, or a hybrid of both. Moreover, although depicted as a recreational vehicle, the towing vehicle 107 may be any other type of a passenger or commercial automobile such as, for example, a tow truck, a van, a truck, etc.

The one or more network(s) 125 illustrate an example of one possible communication infrastructure in which the connected devices may communicate. The one or more network(s) 125 may be and/or include the Internet, a private network, public network or other configuration that operates using any one or more known communication protocols such as, for example, transmission control protocol/Internet protocol (TCP/IP), Bluetooth®, Wi-Fi, Ultra Wide Band (UWB) and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The TCU 160 can include communication and control access to a plurality of vehicle computing modules such as, for example, a Controller Area Network (CAN) bus 180, one or more Engine Control Modules (ECMs) 185, a Transmission Control Module (TCM) 190, and/or a Body Control Module (BCM) 195. Control and/or communication with other control modules not shown in FIG. 1 is possible, and such control is contemplated. In some aspects, the TCU 160 may control aspects of the vehicle 105 through the control modules 180-195 and implement one or more instruction sets received from the application(s) 135 operating on the mobile device 120.

The TCM 190 may provide information to the automotive computer 145 indicative of a Neutral towing mode setting for the vehicle 105. As discussed in greater detail hereafter, the Neutral towing mode may describe particular vehicle configurations and/or settings that place the vehicle 105 in a condition for safe towing by another vehicle (e.g., the towing vehicle 107). Other control modules including, for example, the BCM 195 and/or the ECM may provide indications of one or more sensor settings indicative of a door actuation, a switch actuation, etc., which may be usable by the automotive computer 145 to make a determination whether the vehicle 105 is in a towing mode, and for determining operational characteristics associated with safe and/or problematic towing of the vehicle 105.

The automotive computer 145 may include one or more processor(s) 150 and a computer-readable memory 155. The automotive computer 145 may be installed in an engine compartment of the vehicle 105 (or elsewhere in the vehicle 105) as part of a sustained neutral management system in accordance with the disclosure. The automotive computer 145 may include, in one example, the one or more processor(s) 150, and a computer-readable memory 155. In other example embodiments, the TCU 160 may be integrated with and/or be incorporated with the automotive computer 145. For the sake of simplicity, the illustrated computing system architecture of the automotive computer 145 may omit certain computing modules.

The one or more processor(s) 150 may be disposed in communication with one or more memory devices (e.g., the memory 155 and/or one or more external databases not shown in FIG. 1). The one or more processor(s) 150 may utilize the memory 155 to store programs in code and/or to store data for performing operations in accordance with the disclosure. The memory 155 may be a non-transitory computer-readable memory. The processor(s) 150 may be configured to execute computer-executable instructions stored in the memory 155 for performing various functions of the sustained neutral management system, as well as for performing vehicle control capabilities in accordance with the disclosure. Consequently, the memory 155 may be used for storing code and/or data code and/or data for performing operations in accordance with the disclosure.

The memory 155 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc).

The memory 155 may be one example of a non-transitory computer-readable medium, and may be used to store programs in code and/or to store data for performing various operations in accordance with the disclosure. The instructions in the memory 155 can include one or more separate programs, each of which can include an ordered listing of computer-executable instructions for implementing logical functions. In another exemplary implementation, some or all components of the automotive computer 145 may be shared with the TCU 160.

The memory 155 may store various code modules such as, for example, a secure communication controller (not shown in FIG. 1) for establishing the one or more wireless channel(s) 130, which may, in some embodiments, be encrypted channel(s) and/or unencrypted channels between the mobile device 120, the TCU 160, and/or the automotive computer 145. The memory 155 may also receive the one or more instruction sets including, for example, operational characteristics data 137 from the mobile device 120, and/or other instruction sets (not shown in FIG. 1) that one or more computing modules associated with the cloud-based server(s) 170, and/or the towing vehicle 107 may transmit.

According to an example embodiment, a user (not shown in FIG. 1) may operate the towing vehicle 107 while towing the vehicle 105. The user may also control the mobile device 120 upon which one or more application(s) 135 (hereafter the "application(s) 135") may operate. For example, the mobile device 120 may be disposed in communication with one or more systems configured to provide, at least in part, the sustained neutral management of the vehicle 105 during towing operations. Sustained neutral management may include, for example, determining whether the vehicle 105 is in a Neutral gear setting (or the equivalent thereof as applied to an electric vehicle, an autonomous vehicle, etc.), and determining aspects of the operation of the vehicle 105 that may be inconsistent with allowable parameters for operating the vehicle 105 in neutral (towing mode) setting. The sustained neutral management may further include automatic issuance of commands, by the automotive computer 145, which can include electronic code and/or instructions that cause the vehicle 105, the towing vehicle 107, and/or the mobile device 120 to provide alerts to a driver of the towing vehicle 107, or to another individual associated with the vehicle 105.

In short, the automotive computer 145, and/or the cloud-based server(s) 170, and/or the application(s) 135, may determine whether the vehicle 105 is in a neutral mode setting, evaluate characteristics of the vehicle's 105 operation as it is being towed by the towing vehicle 107 (operational characteristics data), and determine whether the vehicle 105 may be operating outside of allowable parameters so as to avoid vehicle 105 damage.

A neutral mode setting may include any combination of settings that may vary based on the type of vehicle being considered, and the powertrain configuration of the vehicle. For example, if the vehicle 105 is configured with a conventional automatic transmission, the neutral mode setting may include placing an automatic transmission (not shown in FIG. 1) of the vehicle 105 in a neutral mode using a console shifter mechanism (not shown in FIG. 1) in the cab of the vehicle 105. In this example, the neutral mode setting may further include any of the following (not shown in FIG. 1): leaving a key in the ignition position, pressing or depressing one or more start/stop buttons associated with the ignition of the vehicle 105, locking or unlocking the vehicle, actuating seat belt mechanisms, opening or closing vehicle doors, actuating/releasing a parking brake, pressing or depressing a brake pedal, and/or performing other acts that place the vehicle 105 in a neutral mode setting that allows towing of the vehicle 105 within operational limits.

Operational limits may include limits as to towing speed when one or more of the vehicle wheels are touching a surface of the road 102. The operational limits may include one or more values indicative of speed limitations associated with automatic transmission speed, and/or values associated with allowable actuation speed for electric motors in the vehicle wheels. The operational limits may further include a maximum voltage value for voltages measured across the vehicle circuitry (not shown in FIG. 1), a current value associated with a measured electric current associated with the vehicle circuitry, a transmission lubrication metric associated with required lubrication of transmission mechanisms (not shown in FIG. 1) for the vehicle 105, a battery charge measurement, a battery depletion rate, a distance traveled while in a neutral towing mode, a time associated with being in a neutral towing mode, a value indicative of total miles towed within a predetermined span of time, and/or the like.

In another aspect, the neutral mode setting(s) described herein may be associated with a method for towing the vehicle 105. For example, the set of neutral mode settings may be associated with two-wheel towing, where either the front wheels closest to the driver position or the rear wheels closest to the rear of the vehicle are in contact with a surface of the road 102 while being towed, and the opposite two wheels are elevated such that they are not in contact with a surface of the road 102, as would be the case when the vehicle 105 is towed with a dolly or trailer, or when the towing vehicle 107 is configured as a commercial wrecker.

In other aspects, the neutral mode setting(s) described herein may include one or more settings associated with four-wheel towing (as depicted in FIG. 1), where all four wheels of the vehicle 105 are in contact with a surface of the road 102. Four-wheel towing is sometimes used when towing the vehicle 105 behind a recreational vehicle (as depicted in FIG. 1).

The mobile device 120 may be disposed in communication with the automotive computer 145 such that the application(s) 135 provide input data to the automotive computer 145, and/or receive data such as an alert signal 139. In one example where the mobile device 120 is operational as part of the sustained neutral management system (e.g., the sustained neutral management system 200 as discussed hereafter with respect to FIG. 2), the mobile device 120 may provide input data (e.g., vehicle operational characteristics data 137) associated with the vehicle 105. The automotive computer 145 may receive the operational characteristics data 137, which may change with time while the vehicle 105 is in a towing mode setting (and/or while the vehicle 105 is being towed while in an incorrect operational setting). The automotive computer 145 may use that data to determine one or more vehicle actions to be performed that may provide alerts as to likely imminent danger or harm to the vehicle 105, and/or actions that may provide a remedy. As explained in greater detail hereafter, among those possible actions, the automotive computer 145 may generate an alert signal indicative that the vehicle 105 may likely be imminently damaged due to extant operational parameters that are exceeding allowable operational limits. In other words, where vehicle damage may be caused by continuing the towing operation unless an action is imminently taken.

In one example, the mobile device 120 may be used to determine vehicle speed of the towed vehicle 105, because the mobile device 120 may be traveling at the same speed as the vehicle 105 (although possibly in the interior cabin of the towing vehicle 107). The mobile device 120 may wirelessly send operational characteristics data 137 (e.g., speed, time, location, and/or other data) to the automotive computer 145. The automotive computer 145 may use the operational characteristics data 137 to perform one or more actions for the vehicle 105 based at least in part on the operational characteristics data 137, and the current towing mode setting associated with the vehicle 105. The towing mode setting may be indicated by the TCU 160, or by another vehicle system.

In other aspects, the application(s) 135 on the mobile device 120 may receive one or more alert signals indicative that the vehicle 105 is likely to experience an imminent negative outcome, such as, for example, damage to a battery system, a transmission component, a motor, tires, wheel rims, electric circuitry, and/or other system elements. In other aspects, the application(s) 135 may provide the input data to the automotive computer 145, which may use that data, at least in part, to determine vehicle operation characteristics that may change with time while the vehicle 105 is in a towing mode setting. For example, the mobile device 120 operating the application(s) 135, may receive a GPS signal from the GPS 175 via a GPS transceiver (not shown in FIG. 1), and determine a vehicle speed of the towed vehicle (the vehicle 105) based at least in part on the GPS signal using a GPS transceiver (not shown in FIG. 1) onboard the mobile device 120. In some aspects, the application(s) 135 may generate an alert signal based at least in part on determining that the vehicle 105 is being towed at a vehicle speed that exceeds a predetermined value for a sustainable towing speed associated with the vehicle.

The automotive computer 145 may further determine at least one vehicle operation characteristic that changes with time while the vehicle 105 is in a towing mode setting (and/or while the vehicle 105 is being towed by the towing vehicle 107). The vehicle operational characteristic may include a vehicle speed for the vehicle 105 (the towed vehicle). In this example, the automotive computer 145 may perform one or more vehicle 105 actions based at least in part on the towing mode setting and the vehicle operational characteristic (the vehicle speed). For example, the vehicle speed while being towed may exceed an operational limit set for the transmission or other components of the vehicle 105.

The mobile device 120 may communicate with the vehicle 105 through the one or more wireless channel(s) 130, established between the mobile device 120 and a Telematics Control Unit (TCU) 160. The mobile device 120 may communicate with the TCU 160 using a wireless transmitter (not shown in FIG. 1) associated with the TCU 160 on the vehicle 105.

Figure 2:
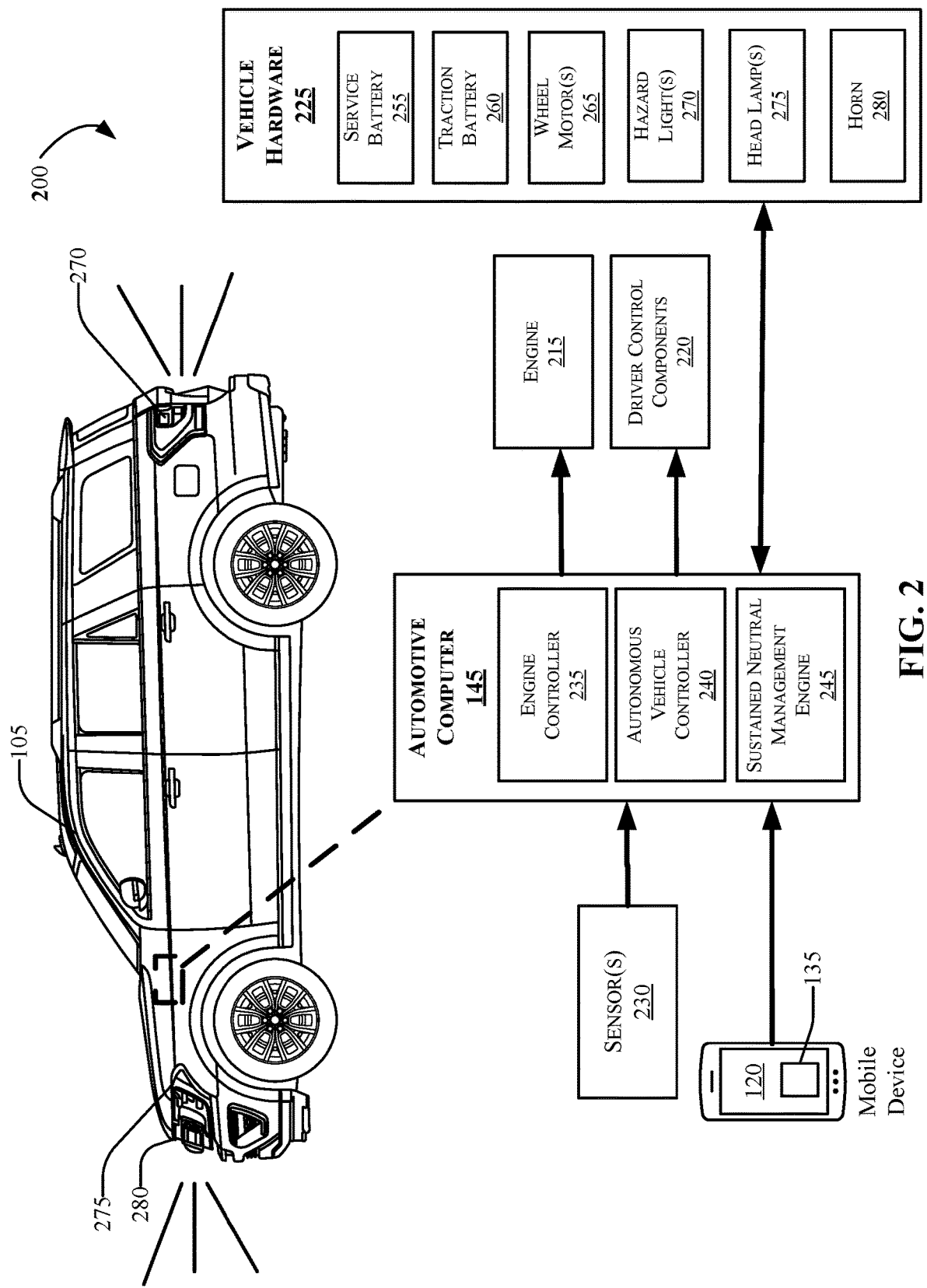
FIG. 2 illustrates an exemplary automotive computer 210 in accordance with the present disclosure.

FIG. 2 illustrates a sustained neutral management system 200 that includes the exemplary automotive computer 145, which may be installed in an engine compartment of the vehicle 105 (or elsewhere in the vehicle 105) in accordance with the disclosure. The vehicle 105 may include an engine 215, one or more driver control component(s) 220, vehicle hardware 225, and one or more sensor(s) 230. In some cases, the engine 215 is customizable to allow operation of the vehicle 105, and may be controlled using an engine controller 235. For example, the automotive computer 145 may cause the engine controller 235 to generate and execute a motor start command that causes the engine 215 to start.

The automotive computer 145 may further include an autonomous vehicle controller system 240, and a sustained neutral management engine 245. One or more mobile device(s) (e.g., the mobile device 120) may be configured to communicate data to and from the automotive computer 145 using one or more wireless and/or wired communications protocols described herein. Such data transfer has been described in some detail above with respect to FIG. 1.

The sustained neutral management engine 245 (hereafter "the neutral management engine 245" may be configured to determine a vehicle configuration indicative of a towing mode setting for the vehicle 105, and receive information that may indicate whether the vehicle 105 is being towed (either correctly or incorrectly), and whether the vehicle 105 may be in danger of imminent damage resulting from that towing operation. Accordingly, the neutral management engine 245 may receive information from the one or more sensor(s) 230, which may be associated with and/or controlled by the ECMs 185, the TCM 190, and/or the BCM 195 (depicted in FIG. 1), where the information can include a signal indicative of a neutral transmission gear setting, a vehicle speed, or another similar signal. The transmission gear setting can further indicate whether the vehicle 105 is in a towing mode setting. The other signals received by the neutral management engine 245 may indicate whether the vehicle 105 is being towed, and whether vehicle damage may be imminent based on one or more values that change with time.

For example, the neutral management engine 245 may receive information from the vehicle hardware 225 indicative of a charge status associated with one or more service batteries 255, one or more traction batteries 260, and/or other batteries associated with operation of the vehicle 105. Accordingly, the automotive computer 145 may query one or more of the ECMs 185, TCM 190, and/or the BCM 195 associated with the vehicle hardware 225, receive a signal indicative of a charge status of one or more of the service battery 255 and the traction battery 260, and determine, based at least in part on the signal, whether vehicle damage may be imminent by comparing the signal to predetermined data associated with safe operational parameters for the vehicle being towed. Querying may take place at periodic intervals, and determine, based on mathematical operations on the series of periodic values, whether one or more of the values provide a usable data source for determining the operational parameters. For example, the mathematical operations may include a running average, a statistical analysis, and/or another mathematical operation.

The predetermined data may be stored in, for example, the memory 155 depicted with respect to FIG. 1. In one example embodiment, the neutral management engine 245 may perform, based at least in part on the towing mode setting and the vehicle operation characteristic values, one or more vehicle actions that include generating an alert signal indicative that damage to the vehicle 105 may be imminent. For example, the neutral management engine 245 may generate the alert signal based at least in part on determining that the vehicle 105 is being towed at a vehicle speed that exceeds the predetermined value for sustainable towing speed associated with the vehicle 105.

In other aspects, the neutral management engine 245 may receive information associated with the wheel motor(s) 265, such as, for example, an output voltage associated with actuation of the wheel motor(s) 265. The neutral management engine 245 may determine, based at least in part on the vehicle speed, a charge status of one or more of the service battery 255, and the traction battery 260. The neutral management engine 245 may start the motor (e.g., the engine 215) of the vehicle 105 based at least in part on the vehicle 105 speed and the charge status of the service battery 255 and/or the traction battery 260.

In other aspects, the neutral management engine 245 may query one or more voltage detection devices (not shown in FIG. 2), and/or one or more current detection devices (not shown in FIG. 2) associated with the vehicle 105 circuitry. In the present example, the neutral management engine 245 may charge, via the engine 215, one or more of the service battery 255 and the traction battery 260 to a predetermined charge value, and turn off the engine 215 responsive to determining that a charge of one or more of the service battery 255 and the traction battery 260 has reached the predetermined charge value. The predetermined charge value may be stored as a predetermined value in the memory 155.

In another example, the neutral management engine 245 may evaluate a transmission output speed for the vehicle 105, where the transmission output speed may be caused by one or more vehicle 105 wheels rolling on the surface of the road 102 (as shown in FIG. 1). This inquiry may determine, at least in part, whether the transmission of the vehicle 105 is functioning at or above allowable operational limits in the neutral mode operation without damaging the transmission. This inquiry may also consider whether the transmission of the vehicle 105 is adequately lubricated, by providing one or values indicative of a relative lubrication setting including, for example, a lubricant pressure, temperature, level, etc. Allowable operational limits with respect to the transmission may include lubricant level, lubricant quality, lubricant and/or transmission temperature, transmission speed, and/or other values.

In some aspects, the neutral management engine 245 may determine that an alert to an operator of the towing vehicle (e.g., 107 as shown in FIG. 1) may be necessary to avoid imminent harm to the vehicle 105. To make this determination, the neutral management engine 245 may evaluate one or more of the operational characteristics described above, and determine whether the value(s) associated with the operational characteristics exceed predetermined thresholds for allowable operation. The neutral management engine 245 (and more precisely, the processor(s) 150 executing the neutral management engine 245) may determine a value or series of values for which any one or more of the operational limits have been exceeded. Accordingly, when the threshold(s) saved in the memory 155 have been exceeded by the operational values, and/or when they have been exceeded by margins exceeding predetermined margin thresholds, the neutral management engine 245 may cause one or more vehicle actions that can include generating an alert signal indicative that vehicle damage may be imminent. The signal may be flashing one or more hazard light(s) 270, one or more head lamp(s) 275, and/or a horn 280 such that the towing vehicle 107 is alerted.

In other aspects, the neutral management engine 245 may determine a geographic location for the vehicle 105 using the GPS 175, for example. The neutral management engine 245 may determine and/or locate a jurisdictional rule, if one exists, that limits noise, light, or other vehicle audible outputs due to noise sensitive and/or light sensitive populations in the area. For example, based at least in part on the vehicle location, the neutral management engine 245 may generate, based at least in part on the jurisdictional rule, a control command for outputting the alert signal indicative that vehicle damage may be imminent, where the control command may result in an alert that does not generate audible noise outside of the vehicle(s) 105 and/or 107. For example, the automotive computer 145 may generate a command and broadcast the command to the towing vehicle 107 that is towing the vehicle 105, where the command is configured to cause the towing vehicle 107 to flash a hazard signal onboard the towing vehicle 107 without sounding a horn or alarm.

In another aspect, the automotive computer 145 may generate a command, and broadcast the command to the towing vehicle 107 that is configured to cause a rear camera system (not shown in FIG. 1 or FIG. 2) onboard the towing vehicle 107 to display a view of the vehicle 105 being towed, and/or the hazard signal output of either the vehicle 105 and/or the towing vehicle 107. In this example, the command may alert the driver, again without sounding an alarm.

In another example, the automotive computer 145 may generate a text notification and broadcast the notification to the mobile device 120 associated with the vehicle 105. The mobile device 120 may be in view of and/or be operated by a driver of the towing vehicle 107.

In another example, the automotive computer 145 may generate a text notification and broadcast the notification via a cloud-based server(s) 170 associated with the vehicle 105. In this embodiment, the cloud-based server(s) 170 may transmit the notification to the mobile device 120 from the cloud-based server(s) 170, where the server(s) 170 provide central management services to a fleet of vehicles associated with the vehicle(s) 105 and/or 107.

Figure 3:
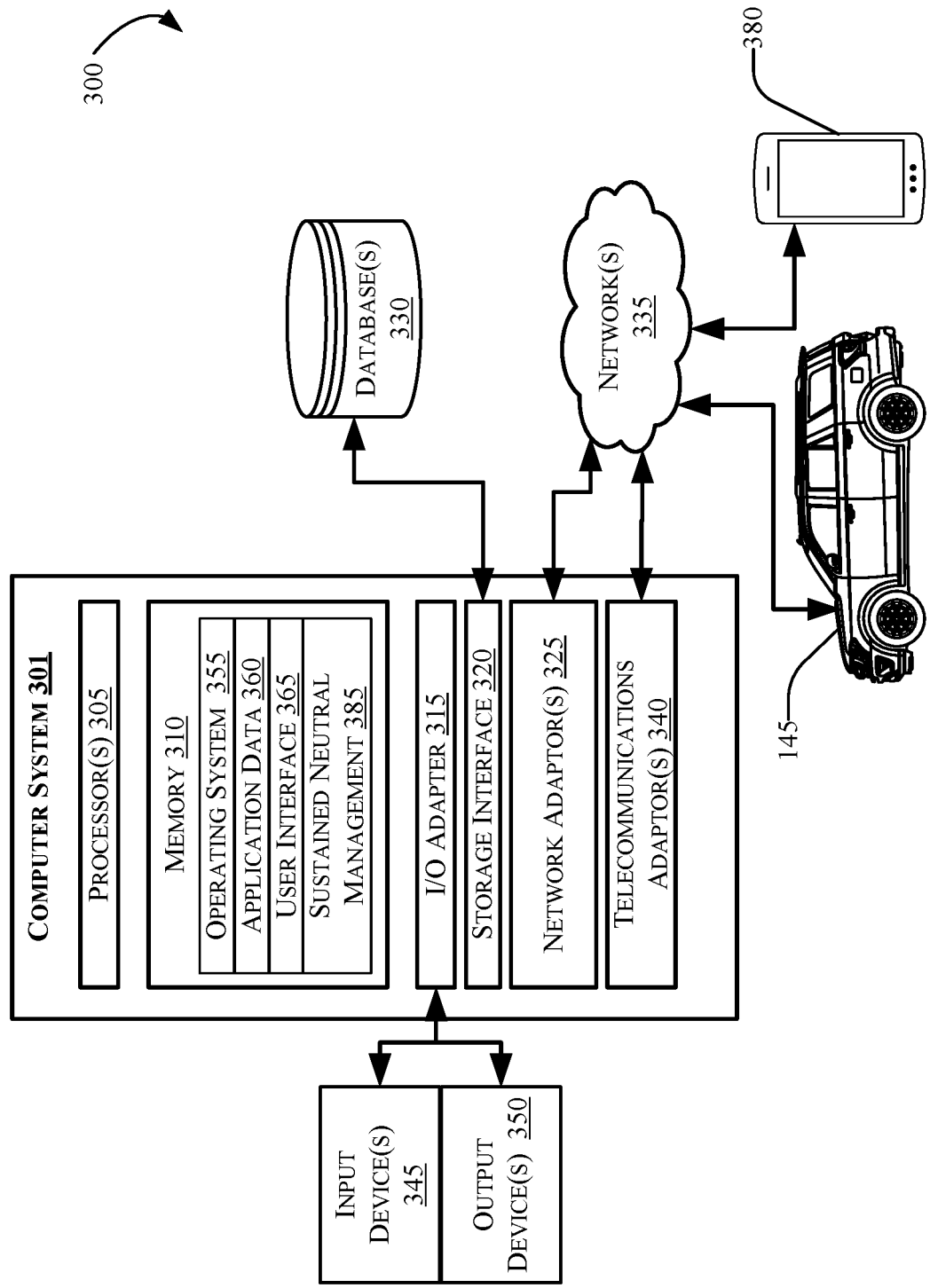
FIG. 3 illustrates a block diagram of an exemplary computing environment and computer system for use in practicing the embodiments described herein.

FIG. 3 illustrates a block diagram of a computing environment 300, which may include a computer system 301 for use in practicing the embodiments described herein. The environment and system described herein can be implemented in hardware, software (e.g., firmware), or a combination thereof. The computer system 300 may be representative of one or more of the computing systems depicted with respect to FIGS. 1 and 2. For example, the one or more cloud-based server(s) 170 may be substantially similar or identical to the computer system 301.

The computer system 301 may include one or more processor(s) 305, a memory 310 communicatively coupled to the one or more processor(s) 305, and one or more input/output adaptors 315 that can communicatively connect with external devices such as, for example, input devices 345 and/or output devices 350. The computer system 301 may operatively connect to and communicate information with one or more internal and/or external memory devices such as, for example, one or more databases 330 via a storage interface 320. The computer system 301 may also include one or more network adaptor(s) 325 enabled to communicatively connect the computer system 301 with one or more network(s) 335. In one embodiment, the computer system 301 can include one or more telecommunications network(s) for communication between the computer system 301 and any external device. The computer system 301 can further include one or more telecommunications adaptor(s) 340.

The one or more processor(s) 305 are collectively a hardware device for executing program instructions (aka software), stored in a computer-readable memory (e.g., the memory 310). The one or more processor(s) 305 can be a custom made or commercially-available processor, a central processing unit (CPU), a plurality of CPUs, an auxiliary processor among several other processors associated with the computer system 301, a semiconductor-based microprocessor (in the form of a microchip or chip set), or generally any device for executing instructions.

The one or more processor(s) 305 may be disposed in communication with one or more memory devices (e.g., the memory 310 and/or one or more external databases 330, etc.) via a storage interface 320. The storage interface 320 can also connect to one or more memory devices including, without limitation, one or more databases 330, and/or one or more other memory drives (not shown in FIG. 3) including, for example, a removable disc drive, a vehicle computing system memory, cloud storage, etc., employing connection protocols such as serial advanced technology attachment (SATA), integrated drive electronics (IDE), universal serial bus (USB), fiber channel, small computer systems interface (SCSI), etc.

The memory 310 can include one or a combination of volatile memory elements (e.g., dynamic random access memory (DRAM), synchronous dynamic random access memory (SDRAM), etc.) and can include one or more nonvolatile memory elements (e.g., erasable programmable read-only memory (EPROM), flash memory, electronically erasable programmable read-only memory (EEPROM), programmable read-only memory (PROM), etc.

The instructions in the memory 310 can include one or more separate programs, each of which can include an ordered listing of computer-executable instructions for implementing logical functions. In the example of FIG. 3, the instructions in the memory 310 can include an operating system 355. The operating system 355 can control the execution of other computer programs such as, for example the sustained neutral management system 385, and provides scheduling, input-output control, file and data management, memory management, and communication control and related services.

The program instructions stored in the memory 310 can further include application data 360, and instructions for controlling and/or interacting with the computer through a user interface 365.

The I/O adaptor 315 can connect a plurality of input devices 345 to the computing system 301. The input devices can include, for example, a keyboard, a mouse, a microphone, a sensor, one or more virtual keyboard(s) on a touchscreen interface, or another conventional input device.

The I/O adaptor 315 can also connect a plurality of output device(s) 350, which can include, for example, a display, a speaker, a touchscreen, etc. The output device(s) 350 may include one or more display adaptor(s) coupled to one or more display(s) (not shown in FIG. 3). The output devices 50 can include but are not limited to a printer, a scanner, and/or the like. Other output devices can also be included, although not shown.

Finally, the I/O devices 345 and 350 that may be connectable to the I/O adaptor 315 can further include devices that communicate both inputs and outputs, for instance but are not limited to, a network interface card (NIC) or modulator/demodulator (for accessing other files, devices, systems, or a network), a radio frequency (RF) or other transceiver, a Near Field Communication (NFC) device, a Bluetooth Low energy receiver, an Ultra Wide Band (UWB) transceiver an ad-hoc networking device, a bridge, a router, etc.

According to some example embodiments, the computer system 301 can include one or more telecommunications adaptor(s) 340 that may be disposed in communication with mobile telecommunications infrastructure such as, for example, mobile phone towers, satellites, vehicle-to-vehicle network infrastructure, etc. The telecommunications adaptor(s) 340 can also include and/or be disposed in communication with one or more other adaptors configured to transmit and/or receive cellular, mobile, and/or other communications protocols for wireless communication.

In some embodiments, the telecommunications adaptor(s) 340 may couple the computer system 301 to one or more network(s) 335. The network(s) 335 may be substantially similar to or identical to the network(s) 125 (depicted in FIG. 1). The network(s) 335 may be and or include the Internet, a private network, public network or other configuration that operates using any one or more known communication protocols such as, for example, transmission control protocol/Internet protocol (TCP/IP), Bluetooth °, Wi-Fi, UWB, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples. The network(s) 335 can also be and/or include a packet-switched network such as a local area network, wide area network, metropolitan area network, the Internet, or other similar type of network environment.

The computer system 301 may transmit and receive data between the network(s) 335 and devices and/or systems external to the computer system 301. For example, the network(s) 335 may operatively connect the automotive computer 145 with the compute system 301, which may be operative with, substantially similar to, and/or the same as the one or more server(s) 170 as shown in FIG. 1. Accordingly, the computer system 301 may be and/or include one or more cloud-based servers. 100'62. The networks(s) 335 may also be disposed in communication with a mobile device 380, which may be substantially similar to and/or identical to the mobile device 120 depicted with respect to FIGS. 1 and 2.

Figure 4:
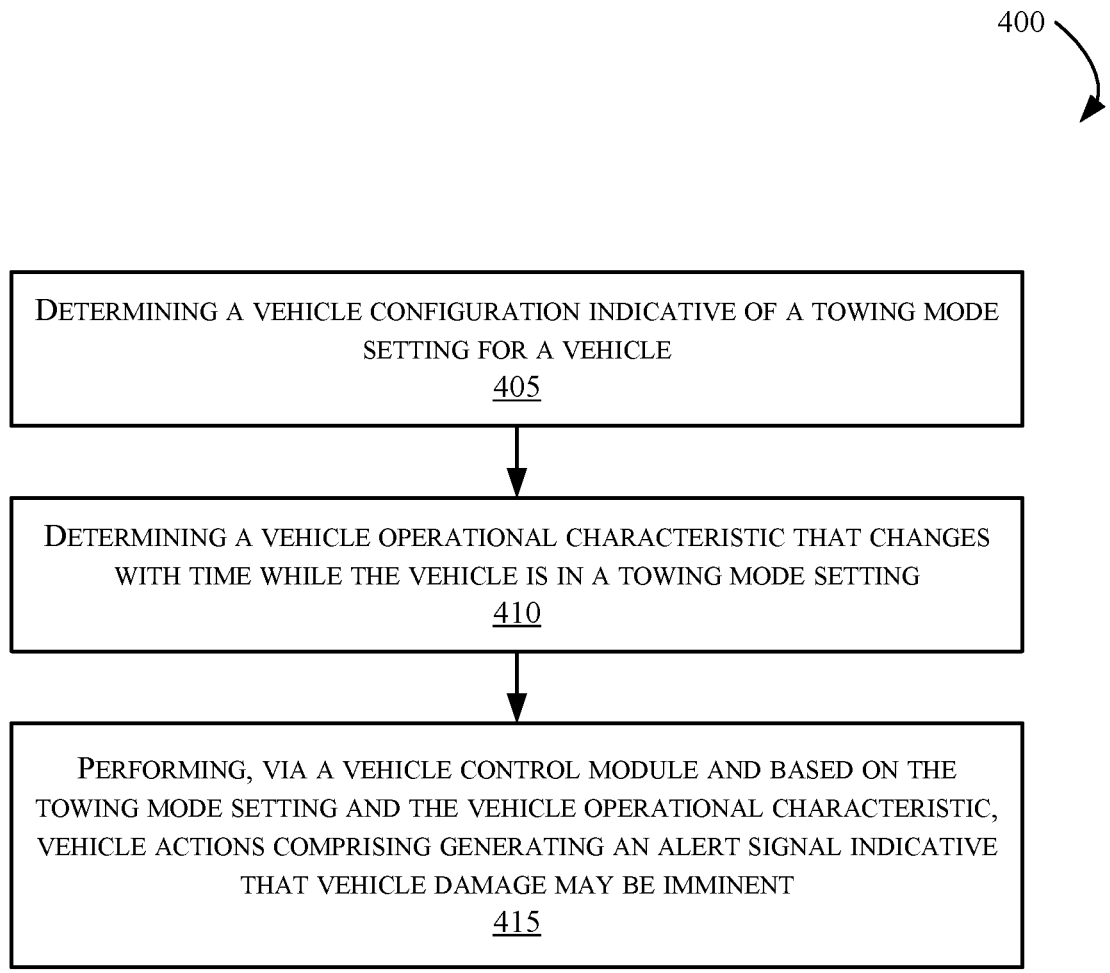
FIG. 4 is a flowchart of an example method for sustained neutral management in a vehicle in accordance with the present disclosure.

FIG. 4 is a flowchart of an example method 400 of the present disclosure. The method 400 generally includes a step 405 for determining a vehicle configuration indicative of a towing mode setting for a vehicle 105.

At step 410, a processor (e.g., the processor(s) 150) may determine at least one vehicle operational characteristic that changes with time while the vehicle 105 is in a towing mode setting.

At step 415, the processor(s) 150 may perform, via a vehicle control module (e.g., via the vehicle hardware 225 shown in FIG. 2), and based at least in part on the towing mode setting and the vehicle operational characteristic, and one or more vehicle actions. The vehicle actions can include generating an alert signal indicative that vehicle damage may be imminent.

The generating may be performed, for example, by executing, via one or more control modules of the vehicle 105, the control command. The control command may cause the control module to sound an audible horn 280 of the vehicle 105. In other aspects, the control command may cause the control module to flash one or more head lamp(s) 275 of the vehicle 105. In yet other aspects, the generating may be performed by broadcasting a command to a towing vehicle 107 that is towing the vehicle 105. The command may be configured to cause the towing vehicle 107 to flash a hazard signal.

In another example, the command is configured to cause a rear camera system onboard the towing vehicle 107 to display a view of the vehicle 105, where the driver or other operators of the towing vehicle 107 may notice that an imminent action is necessary to avoid damage to the vehicle 105.

In another example, the command is configured to cause the automotive computer 145 to generate a notification, and broadcast the notification to a mobile device 120 associated with the vehicle 105.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A computer-implemented method, comprising:
   determining a vehicle configuration indicative of a towing mode setting for a vehicle;
   determining a vehicle operational characteristic that changes with time while the vehicle is in a towing mode setting; and
   performing, via a vehicle control module and based on the towing mode setting and the vehicle operational characteristic, vehicle actions comprising generating an alert signal indicative that vehicle damage may be imminent;
   wherein determining the vehicle operation comprises determining a vehicle speed; and wherein the vehicle actions comprise:
      determining a charge status of a service battery and/or a traction battery;
      starting an engine of the vehicle based on the vehicle speed and/or the charge status of the service battery and/or the traction battery;
      charging, via the engine, the service battery and/or the traction battery to a predetermined charge value; and
      turning off the engine responsive to determining that a charge of the service battery and/or the traction battery has reached the predetermined charge value.

2. The computer-implemented method according to claim 1, wherein the towing mode setting comprises a neutral transmission gear setting.

3. The computer-implemented method according to claim 1, wherein the vehicle actions comprises:
   determining, based on the vehicle speed, that the vehicle is being towed at a speed that exceeds a predetermined value for sustainable towing speed; and
   generating the alert signal based on determining that the vehicle is being towed at a vehicle speed that exceeds the predetermined value for sustainable towing speed associated with the vehicle.

4. The computer-implemented method according to claim 1, wherein determining the vehicle operational characteristic comprises:
   determining a voltage production of a traction motor;
   comparing the voltage production to a predetermined limit for voltage; and
   generating an over-voltage indication responsive to determining that the voltage production exceeds the predetermined limit for voltage.

5. The computer-implemented method according to claim 1, wherein determining the vehicle operational characteristic comprises:
   determining a transmission output speed for the vehicle.

6. The computer-implemented method according to claim 1, wherein determining the vehicle operational characteristic comprises:
   determining a wheel speed for a front wheel of the vehicle and a rear wheel of the vehicle.

7. The computer-implemented method according to claim 1, wherein determining the vehicle operational characteristic comprises:
   determining a charge status of a service battery or a traction battery.

8. The computer-implemented method according to claim 1, wherein the vehicle actions comprise:
   determining a vehicle location;
   determining a jurisdictional rule based on the vehicle location; and
   generating, based on the jurisdictional rule, a control command for outputting the alert signal indicative that vehicle damage may be imminent.

9. The computer-implemented method according to claim 8, wherein the vehicle actions comprises:
   executing, via control modules of the vehicle, the control command, wherein the control command causes the control module to sound an audible horn of the vehicle.

10. The computer-implemented method according to claim 1, wherein the vehicle actions comprise:
   executing, via control modules of the vehicle, the control command, wherein the control command causes the control module to flash one or more front lamps of the vehicle.

11. The computer-implemented method according to claim 10, wherein the vehicle actions comprise:
   broadcasting a command to a towing vehicle that is towing the vehicle, wherein the command is configured to cause the towing vehicle to flash a hazard signal.

12. The computer-implemented method according to claim 11, wherein the command is configured to cause a rear camera system onboard the towing vehicle to display a view of the towed vehicle.

13. The computer-implemented method according to claim 10, wherein the vehicle actions comprise:
   generating a notification; and
   broadcasting the notification to a mobile device associated with the towed vehicle.

14. The computer-implemented method according to claim 13, wherein broadcasting the notification to the mobile device associated with the vehicle comprises:
   generating the notification via a cloud-based server associated with the vehicle; and
   broadcasting the notification to the mobile device from the cloud-based server.

15. The computer-implemented method according to claim 10, wherein the vehicle actions comprise:
   generating a notification; and
   broadcasting the notification to a Telematic Control Unit (TCU) associated with a towing vehicle.

16. The computer-implemented method according to claim 10, further comprising:
   determining a towed distance; and
   storing the towed distance to a computer memory.

17. A computer-implemented method, comprising:
   determining a vehicle configuration indicative of a towing mode setting for a vehicle;
   determining a vehicle operational characteristic that changes with time while the vehicle is in a towing mode setting, wherein determining the vehicle operational characteristic comprises:
      determining a voltage production of a traction motor;
      comparing the voltage production to a predetermined limit for voltage; and
      generating an over-voltage indication responsive to determining that the voltage production exceeds the predetermined limit for voltage; and
   performing, via a vehicle control module and based on the towing mode setting and the vehicle operational characteristic, vehicle actions comprising generating an alert signal indicative that vehicle damage may be imminent.

18. A computer-implemented method, comprising:
   determining a vehicle configuration indicative of a towing mode setting for a vehicle;
   determining a vehicle operational characteristic that changes with time while the vehicle is in a towing mode setting; and
   performing, via a vehicle control module and based on the towing mode setting and the vehicle operational characteristic, vehicle actions comprising generating an alert signal indicative that vehicle damage may be imminent, wherein the vehicle actions comprise:
      determining a vehicle location;
      determining a jurisdictional rule based on the vehicle location; and
      generating, based on the jurisdictional rule, a control command for outputting the alert signal indicative that vehicle damage may be imminent.

* * * * *